United States Patent [19]

Schwenninger

[11] 4,099,952
[45] Jul. 11, 1978

[54] MOVABLE SUBMERSIBLE DAM BARRIER FOR USE IN A GLASS FORMING CHAMBER

[75] Inventor: Ronald L. Schwenninger, Wiley Ford, W. Va.

[73] Assignee: PPG Industries, Inc., Pittsburgh, Pa.

[21] Appl. No.: 816,424

[22] Filed: Jul. 18, 1977

[51] Int. Cl.² .......................................... C03B 18/02
[52] U.S. Cl. ............................... 65/182 R; 65/99 A
[58] Field of Search ................. 65/64 A, 99 A, 182 R

[56] References Cited

U.S. PATENT DOCUMENTS

| 3,250,604 | 5/1966 | Toytot et al. | 65/65 A X |
| 3,432,284 | 3/1969 | Gulotta | 65/99 A |
| 3,485,617 | 12/1969 | Lawrenson et al. | 65/99 A |
| 3,625,668 | 12/1971 | Greenler | 65/182 R |
| 3,795,500 | 3/1974 | Murphy | 65/99 A |
| 3,930,829 | 1/1976 | Sensi | 65/182 R X |

Primary Examiner—Arthur D. Kellogg
Attorney, Agent, or Firm—E. Kears Pollock

[57] ABSTRACT

A vented submersible dam barrier for use in a glass forming chamber to selectively interrupt the flow of glass supporting molten metal is disclosed. The disclosed barrier includes a dense inner body and an outer cover or shell with a space or interstices within the shell through which gases may move to an end of the dam barier at which there is mounted a facility for venting the enclosed portion of the dam barrier. Venting may be provided into a space above the surface of the pool of molten metal in which the dam barrier is placed.

10 Claims, 3 Drawing Figures

MOVABLE SUBMERSIBLE DAM BARRIER FOR USE IN A GLASS FORMING CHAMBER

BACKGROUND OF THE INVENTION

1. Field of the Invention

This invention relates to the manufacture of flat glass by processes in which glass is supported on a pool of molten metal during forming. More particularly, this invention relates to dam barriers for placement in a glass-supporting pool of molten metal for influencing flows of molten metal within such a pool.

2. Brief Description of the Prior Art

A number of patents describe the use of devices for segregating one portion of a glass-supporting pool of molten metal from another portion of the glass-supporting pool of molten metal in order to influence the flows of molten metal therein and consequently to influence the temperature of molten metal upon which glass is supported during forming. Beginning with U.S. Pat. No. 789,911 to Hitchcock, which issued in 1905, it has been appreciated that barriers could be employed for separating a glass-supporting pool of molten metal into a plurality of sections. As shown in U.S. Pat. No. 3,432,284 to Gulotta and U.S. Pat. No. 3,485,617 to Lawrenson et al., fixed dam barriers of various designs have been employed to influence thermal conditions within a pool of glass-supporting molten metal during the formation of glass thereon.

U.S. Pat. No. 3,930,829 to Sensi illustrates dam barriers which are movable, submersible dam barriers that can be readily placed in an operating glass forming chamber without disruption of the manufacture of glass and may be manipulated to desired positions in order to establish particularly desired thermal conditions for the manufacture of glass of any desired thickness. The movable, submersible dam barriers disclosed by Sensi each comprise an inner body of dense material in order to insure their submersibility and an outer cover or shell of material which may serve as a protective cover for the inner body depending upon the material employed as an inner body. The present invention comprises an improvement to movable, submersible dam barriers such as those disclosed by Sensi.

It has been found that placement of movable, submersible dam barriers in a glass forming chamber at locations within the chamber where the molten metal temperature is above about 1500° F. (820° C.) yields some bubbling associated with such dam barriers. It is not fully known whether this bubbling is caused by the accumulation of gases dissolved in the molten metal on nucleation sites on a dam barrier and the periodic release of gas bubbles which have grown to sufficient size to separate from the surface upon which they nucleate or if the occurrence of bubbles associated with tin dam barriers employed at locations of extremely high temperature in a forming chamber is due to the discharge of gases from the materials from which the dam barriers are constructed. In either event, the present invention contemplates a method and apparatus improvement which will prevent or minimize the occurrence of bubbles associated with or attributed to the presence of a dam barrier in molten metal within a glass forming chamber at any location throughout such a chamber, including locations at which the molten metal temperature is above 1500° F. (820° C.).

SUMMARY OF THE INVENTION

A glass forming chamber, which includes an enclosure containing a pool of molten metal for supporting glass during its formation is provided with facilities to advance glass along the surface of the pool of molten metal and to cool the glass to form a continuous sheet of glass. The chamber is further provided with one or more submersible dam barriers in the pool of molten metal. The dam barriers are generally located slightly beneath the upper surface of the pool of molten metal and are preferably positioned on the bottom of the enclosure which contains the pool of molten metal. The dam barriers are provided for selectively controlling the flow of molten metal to establish desired thermal conditions within the pool of molten metal.

Each submersible dam barrier comprises an inner body of material sufficiently more dense than the molten metal in which the dam is submerged so that it may be submerged. Each dam barrier further comprises an outer covering or shell of material made of a material that is substantially free from attack by the molten metal. The outer material may be more or less dense than the molten metal itself. The outer material may be a material which experiences some reaction with the molten metal so long as it is not readily destroyed by the molten metal in which it is to be submerged and maintained.

The inner body of material may be a metal, such as molybdenum, tungsten, tungsten-molybdenum alloy, rhenium, osmium, lead or any other known dense material. Preferably, the inner body of material is a material, which, if present in the molten metal itself, would not detrimentally affect the glass or the glassmaking process in the event that a barrier should be broken during installation, removal or use. The outer cover or shell of the dam barrier may be a metal or a refractory material. It may be, for example, a tungsten-molybdenum alloy which is not subject to significant attack by molten tin, the preferred molten metal for supporting glass during forming. It may be a carbon or graphite material or it may be a refractory oxide material, such as a silica or alumina refractory. The outer material may be in the form of a cylindrical tube or other rigid material or it may be made up of a flexible material such as a refractory cloth wrapped about the inner body of dense material.

An embodiment of the present invention which has been found to be particularly useful is one wherein the outer cover or shell is made up of a carbon or graphite cylindrical tube made of one or more sections of tube depending upon the length of barrier desired. Individual lengths of tube may be threaded at each end in the manner of threading pipe with male and female threads. The individual sections may then be joined together to provide a barrier of any desired length. The inner body material in such a dam barrier may be a plurality of tungsten wires, pieces of tungsten rod, molybdenum rod or tungsten-molybdenum alloy rod or granules or powder of tungsten, molybdenum or tungsten-molybdenum alloy.

One end of the barrier is provided with a cap or other means for sealing the interior of the outer cover or shell which contains the inner body from the outside environment and particularly for sealing it from the molten metal into which it is to be submerged. One end of the dam barrier is provided with means for venting the interior of the outer shell or cover so as to vent the space which is substantially filled by the inner body of the dam barrier. In general, there are interstices or an effective enclosed conduit extending throughout the length of the interior of the outer shell of the dam barrier and into communication with a dam barrier venting facility mounted on an end of the dam barrier.

The venting facility may comprise a block fixed to and mounted on an end of the dam barrier with a substantially enclosed conduit extending through the block and into communication with the interior of the outer cover or shell of the dam barrier at one end of the conduit and to an opening in the block at the other end of the enclosed conduit which extends through the block. The block is sized to provide for the opening of the enclosed conduit opposite the opening in communication with the internal portion of the outer shell of the dam barrier to be either in a space above the surface of the pool of molten metal within the glass forming chamber or in a space of reduced pressure in order to provide for the flow of any gases present in the dam barrier to the venting facility and through its enclosed conduit away from the pool of molten metal in which the dam barrier is submerged.

The venting facility may comprise a block mounted on an end of a dam barrier with a bore hole serving as the enclosed conduit.

It is possible to provide a barrier with a venting facility mounted on each end of the dam barrier. In particular, when a dam barrier is designed which is of sufficient length to have a single dam barrier extending fully across or substantially fully across the width of a forming chamber so that a venting facility on each end of the dam barrier may be outboard of any glass advancing through the forming chamber, venting facilities are suitably provided on each end of such a dam barrier.

A particularly preferred embodiment of this invention is one wherein the outer covering of the dam barrier is a gas-permeable material, such as carbon or graphite (either rigid-solid or fabric material), which is a material that is substantially impermeable to molten metal. By use of such an outer cover material, any gases in the pool of molten metal which may accumulate or nucleate as bubbles on the surface of the outer shell or cover of a dam barrier may be caused by pressure or concentration gradients to be driven through the gas permeable outer cover or shell of the dam barrier into the inner space or portion of the dam barrier and conveyed to the venting means at one end or the other of the dam barrier.

A particularly preferred embodiment of this invention is one wherein the outer covering or shell is a carbon or graphite material and the inner body of the dam barrier is provided with a particulate material in addition to the dense inner body. The particulate material serves to insure a sufficient void space through which gases may be transported along the length of the dam barrier while acting as a separator to maintain the inner body of dense material in a desired fixed relationship to the outer covering. A particularly preferred embodiment of this kind is one in which the outer covering or shell is made of a graphite or carbon tube and the particulate material is powdered graphite or carbon. In this embodiment of the invention the inner body of the dam barrier may be rod or wire stock with the powdered carbon dispersed about and through a bundle of the rod or wire stock comprising the inner body. In a particularly preferred embodiment, the inner body comprises a plurality of tungsten wires and the tungsten wires are packed in powdered graphite or carbon.

The venting facility mounted on an end of a dam barrier, according to this invention, may be a block having a flat base which serves to maintain the position of the dam barrier at a location where the block rests on its flat base. Such a block extends above the surface of a pool of molten metal a short distance at a location between a side wall of the glass forming chamber and the edge of glass advancing along the surface of the pool of molten metal in the chamber. The opening of the conduit extending through the block in the communication with the inner portion of the cover or shell of the dam barrier is preferably located in the upper face of the block.

The dam barriers according to this invention may be located in a glass forming chamber at any location where molten metal (tin) flows are desired to be altered, influenced or controlled. While dam barriers of previous designs may be used at locations where molten tin temperatures are below about 1500° F. (810° C.), the dam barriers of this invention are particularly suited for use at locations where tin temperatures of from 1500° F. (810° C.) to 1800° F. (980° C.) or even to 2000° F. (1090° C.) are encountered. Thus, the dam barriers of this invention are useful to control molten tin flows and the temperature of molten glass immediately after its delivery for forming.

DESCRIPTION OF THE PREFERRED EMBODIMENTS

Figure 1:
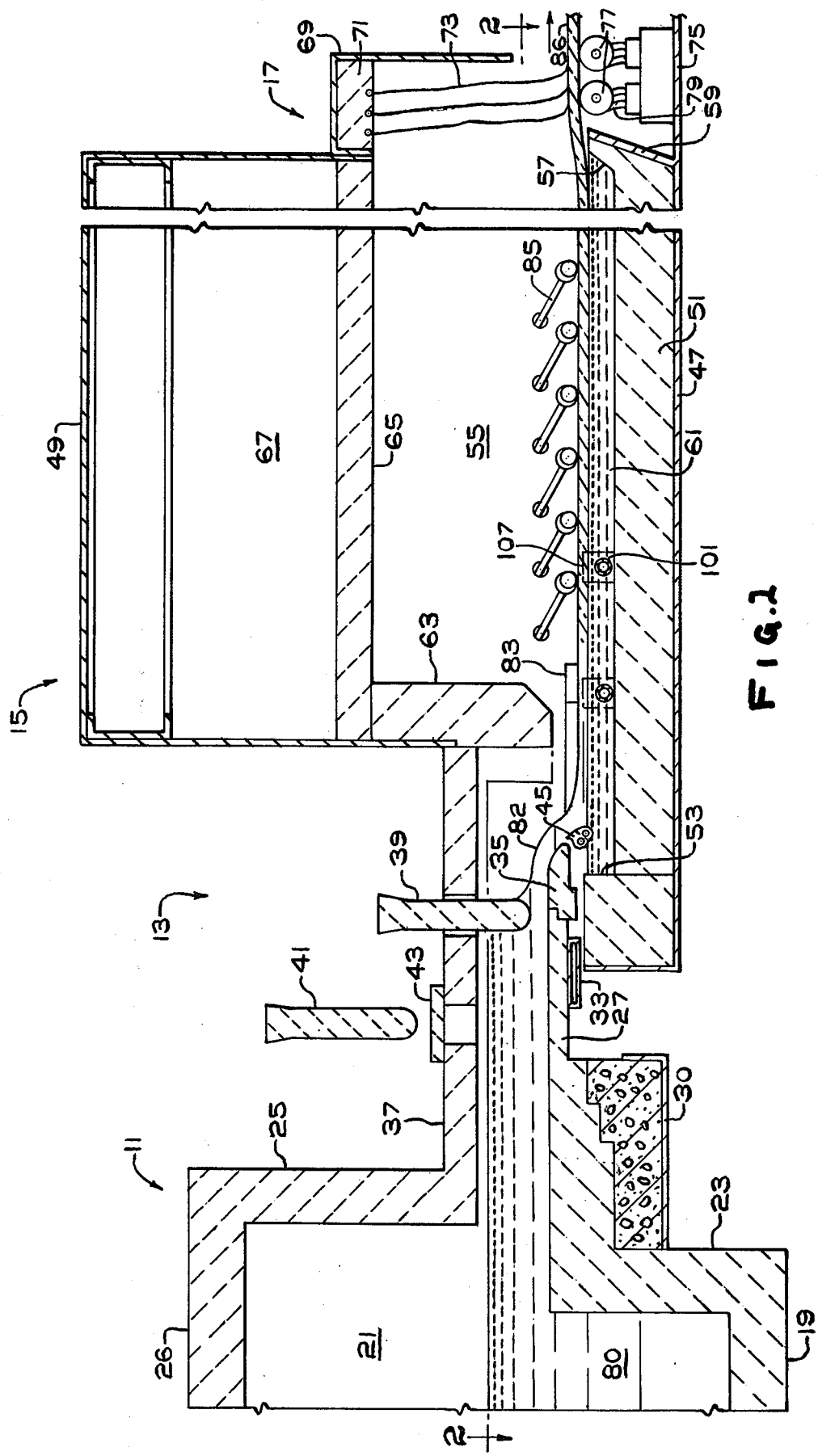
FIG. 1 is a longitudinal sectional elevation of a glass forming chamber employing the invention of vented submersible barriers.
Figure 2:
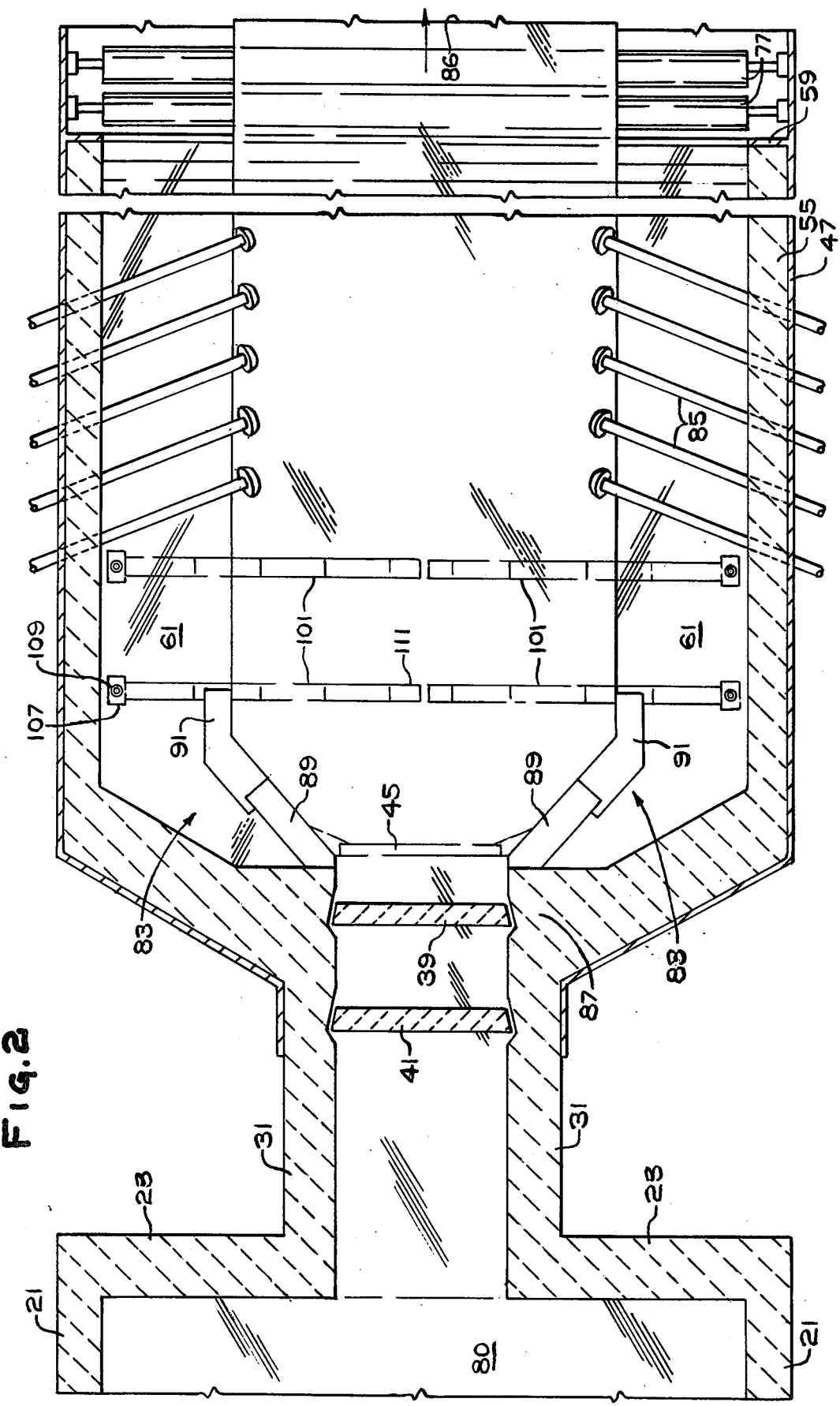
FIG. 2 is a longitudinal sectional plan of the glass forming chamber shown in FIG. 1 taken along section plane 2—2.

Referring to FIGS. 1 and 2, a forming chamber suitably modified to practice this invention is illustrated. A glassmaking furnace or tank terminating with a refiner or conditioner 11 is connected through a molten glass delivery facility 13 to a glass forming chamber 15, which, in turn, is connected to a glass sheet or ribbon removal facility 17.

The glassmaking furnace 11 includes a tank bottom 19 with side walls 21 (including lower, basin wall portions) and a front basin wall 23 to contain molten glass. It further includes an upper front wall 25 and a roof or crown 26.

The molten glass delivery facility 13 may be a threshold assembly as illustrated in U.S. Pat. No. 3,854,922 or may be a conventional float canal as illustrated. Such a canal comprises a canal bottom 27 resting on a support structure 30 (not fully shown). A cooler 33 may be placed under the canal bottom 27. The delivery facility 13 further includes a spout or lip 35 extending forwardly from the canal bottom 27 over a glass receiving space in the forming chamber or bath 15. The delivery facility has a roof or cover 37 through which a metering member or tweel 39 is inserted to control the flow of molten glass along the canal. A back-up tweel 41 to control or stop the flow of molten glass is also provided.

It may be inserted through the canal roof 37 by removal of a cover plate 43. The tweels are suitably mounted (not shown) to permit them to be raised and lowered as desired. In a preferred embodiment the lip 35 is extended, by means of an extensior piece 45, into contact with a pool of molten metal in the forming chamber 15.

The forming chamber or bath 15 includes a lower casing 47 and an upper casing 49. Inside the lower casing 47 is a refractory liner including a bottom 51, an entrance wall 53, side walls 55 (bottom portions) and a exit lip 57 with an exit plate or casing 59.

These walls and the bottom provide a container for a pool of molten metal 61, preferably molten tin.

The upper casing 49 includes the upper portions of side walls 55, an entrance lintel or wall 63, a ceiling or roof 65 and an enclosure or space 67 above the roof 65. Preferably, electric heating elements extend through the roof 65 into a headspace beneath it to provide heat to the working portion of the chamber. Such heating elements are generally connected to bus bars located in the upper space 67 in order to supply electric power to them. The upper space 67 and the lower headspace as well are supplied with a protective atmosphere of inert-to-reducing gases such as a mixture of nitrogen and hydrogen. The headspace is preferably maintained at a slightly positive pressure relative to the outside environment around the forming chamber 15.

The glass removal facility 17 includes an upper roof casing or canopy 69 which encloses an insulating portion 71 and a series of drapes 73 or other sealing devices which extend into contact or close proximity with glass being removed through the facility 17. The facility 17 further includes a bottom enclosure 75 having take-up rolls 77 mounted in it. The rolls 77 may be provided with wiping seals 79.

During operation a pool of molten glass 80 is maintained in the tank or furnace 11 and a stream of molten glass 82 is withdrawn from the furnace 11 and delivered through the canal, over the lip 35 (and optionally over the lip extension 45) onto the pool of molten metal 61 in the forming chamber 15. The glass is advanced along the surface of the pool of molten metal (preferably initially between diverging wetting guides 83) and along toward the exit end of the chamber with the aid of edge rolls 85 and the take-out rolls 77. The width of the advancing glass is preferably maintained as it is stretched along its direction of advance to a desired thickness to form a dimensionally stable, continuous sheet or ribbon of glass 86. The formed continuous sheet of glass is removed from the chamber and is generally conveyed through an annealing lehr prior to cutting into desired segments for sale or further treatment.

Initially, as molten glass is delivered for forming, it flows between side members 87 of the molten glass delivery facility. It then flows between initial diverging portions 89 of the guides 83 and finally between substantially parallel portions 91 of guides 83. Thereafter, the glass is cooled and advanced as it is formed.

As the glass advances along the surface of the pool of molten metal 61, it is cooled. It loses heat to its surroundings by heat transfer to the molten metal supporting it and by heat transfer (radiation and convection) to the roof, side walls and other surroundings in the headspace of the chamber. Significant heat transfer may be established from the glass to coolers which may be placed in the headspace to extend over the glass. Ultimately, heat is transferred from the chamber to the ambient surroundings as, for example, heat transferred to the molten metal is transferred through the bottom 51 and bottom casing 47 to the outside environment.

As heat is transferred from the glass to the glass-supporting molten metal, natural convection currents are established in the pool of molten metal which tend to heat the molten metal at the exit end of the chamber to a higher temperature than would occur if the molten metal were stagnant. This same phenomenon causes the molten tin at any more downstream location to be hotter relative to any more upstream location than if no flow or natural convection of molten metal occurred. Thus, while the exit end of the chamber remains colder than the entrance end, the temperature difference along any incremental length of the chamber may be less than desired. It has long been appreciated that more desirable temperature patterns can be achieved if dam barriers are placed in the molten metal to interrupt and influence naturally occurring molten metal flows.

The present invention contemplates movable, submersible dam barriers similar to those taught in U.S. Pat. No. 3,930,829 to Sensi. As shown in FIGS. 1 and 2, four dam barriers 101 are provided in the chamber. They are shown near its entrance end although they may be employed at other locations in the chamber to achieve desired thermal conditions therein. Each illustrated dam barrier 101 extends partially across the chamber from near a side wall to the vicinity of the longitudinal center line of the chamber. It is possible to extend a single barrier substantially across the full width of a chamber or to join two barriers by butting or overlapping them in the center of a chamber. Generally some free molten metal is permitted above a dam barrier so that the temperature difference in the molten tin from one side to the other of a dam barrier is slightly muted or smoothed.

Figure 3:
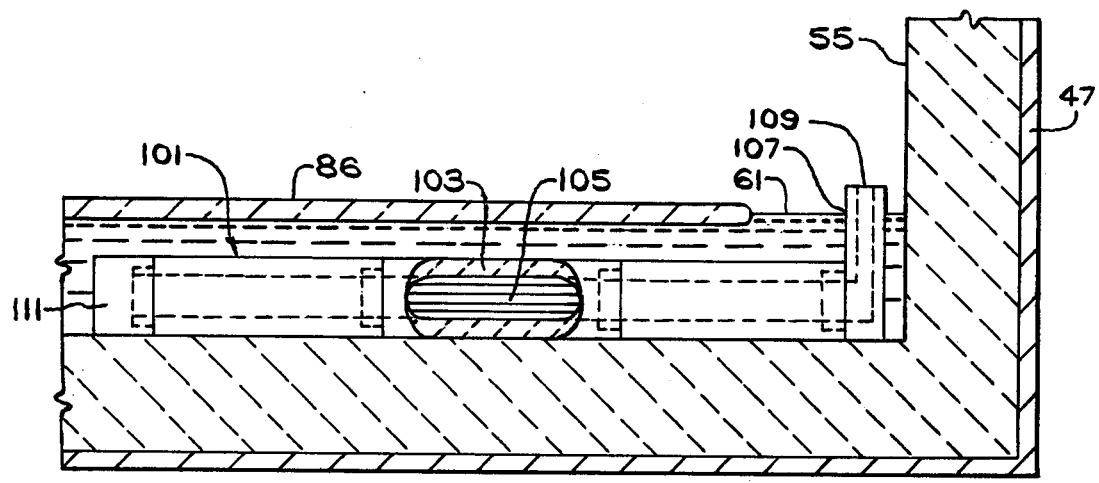
FIG. 3 is a partial lateral sectional elevation of the glass forming chamber with a single dam barrier illustrated in a partial section to show a preferred internal structure of the dam barrier.

A preferred dam barrier structure is shown in FIGS. 1 and 2 and a particularly preferred internal structure is illustrated in FIG. 3. Each dam barrier comprises an outer cover or shell 103 comprised of cylindrical or other shaped tubular material. The outer cover may be made of a series of tubular segments, as shown, joined together by threading or by mating, with or without refractory cement in the joints. Inside the outer cover or shell 103 is an inner body comprising a plurality of fine rod or wire stock of tungsten. Molybdenum or tungsten-molybdenum material may alternatively be used. Also, a single rod or pellets or granules of these dense metals may be employed as an inner body of the assembly. Particles or granules of carbon or graphite or even a refractory such as silica may be dispersed about the dense metal wires or rods to inhibit any flow of molten metal into the interior of the dam barrier while permitting the flow of gases through it.

One end of each dam is preferably provided with a venting assembly such as a vent block 107 through which there is a conduit 109 enclosed by the block. The conduit 109 is in communication with the interior of the dam barrier at one end and opens either to the headspace of the forming chamber at its other end or to a vacuum pump system or other lower pressure environment. A dam barrier having a venting assembly on only one end is preferably provided with an end cap 111 at its end opposite that having a venting assembly. The end cap 111 substantially seals the interior of the dam barrier from the molten metal 61. The particularly preferred embodiment of the invention shown in FIG. 3 has a venting assembly that comprises a vent block 107 having a flat bottom which rests on the bottom 51 of the forming chamber to maintain the dam barrier at the location at which it is set when placed in the chamber. The conduit 109 through the vent block 107 terminates in its upper surface, above the upper surface of the rod of molten metal 61 in the headspace of the chamber. Any gases entering the dam barrier through the joints or walls of the outer cover or shell 103 are transported by thermal concentration or pressure driving forces to the vent block conduit 109 and into the headspace of the forming chamber at a location near a side wall of the chamber outboard of the advancing glass. Thus, the gas is prevented from rising to the under surface of the glass and seeds or bubbles in finished glass attributed to such rising gas bubbles are minimized or avoided.

While this invention has been described with reference to particularly preferred embodiments, those skilled in the art will appreciate that variations within the scope of the applicant's concept may be made without departing from the spirit of the applicant's invention which is defined in the appended claims.

I claim:

1. In a glass forming chamber comprising an enclosure containing a pool of molten metal for supporting glass during its formation as the glass is advanced along the surface of the pool of molten metal and cooled to form a continuous sheet of glass, wherein submersible dam barriers are provided in the pool of molten metal beneath its surface for selectively controlling the flow of molten metal to establish desired thermal conditions, each submersible dam barrier comprising an inner body of material more dense than the molten metal and an outer covering of material which is substantially free from attack by the molten metal, the improvement which comprises
   an inner body comprising a dense metal packed in a particulate material within said outer covering wherein said particulate material provides a sufficient void space for the passage of a gas through it along the interior portion of the dam barrier inside said outer covering and
   means connected to an end of said dam barrier for venting the interior portion of said dam barrier including a substantially enclosed conduit in communication with the interior portion of said dam barrier containing said particulate packing material.

2. The apparatus according to claim 1 wherein said venting means comprises a block mounted onto an end to the dam barrier with a bore hole as the enclosed conduit.

3. The apparatus according to claim 2 wherein the block extends above the upper surface of the pool of molten metal at a location near a side wall of the chamber and the enclosed conduit extends to an opening in the block above the surface of the pool of molten metal.

4. The apparatus according to claim 2 wherein said block is a block having a flat base to maintain the position of the dam barrier at a location where the block rests and wherein the dam barrier is located in the forming chamber at a location where the molten metal temperature is from 1500° to 1800° F. with the block located closely adjacent a side wall of the forming chamber in a region of exposed molten metal as the remainder of the dam barrier is located substantially beneath the surface of the molten metal at a location for supporting the glass.

5. The apparatus according to claim 1 wherein the outer covering is a gas permeable material which is substantially impermeable to molten metal and the interior portion of the dam barrier inside the covering includes sufficient void space to provide a conduit substantially throughout the length of the dam barrier.

6. The apparatus according to claim 5 wherein said outer covering is a carbon material.

7. The apparatus according to claim 6 wherein said outer covering comprises a graphite tube and said particulate material is powdered carbon.

8. The apparatus according to claim 7 wherein said inner body comprises dense metal rod or wire stock and said powdered carbon is dispersed about the dense metal rod or wire stock comprising said inner body.

9. The apparatus according to claim 8 wherein said inner body comprises a plurality of tungsten wires which are packed in powdered carbon.

10. The apparatus according to claim 6 wherein said inner body comprises a packing of dense metal particles dispersed with said particulate material that is unwetted by molten metal.

* * * * *